(12) United States Patent
McKinney

(10) Patent No.: US 7,837,867 B2
(45) Date of Patent: Nov. 23, 2010

(54) DISINFECTANT SYSTEM FOR USE WITH RESIDENTIAL AEROBIC WASTEWATER TREATMENT PLANTS

(76) Inventor: Jerry L. McKinney, P.O. Box 697, Silsbee, TX (US) 77656

( * ) Notice: Subject to any disclaimer, the term of this patent is extended or adjusted under 35 U.S.C. 154(b) by 832 days.

(21) Appl. No.: 11/698,536

(22) Filed: Jan. 26, 2007

(65) Prior Publication Data
US 2007/0175806 A1   Aug. 2, 2007

Related U.S. Application Data

(63) Continuation-in-part of application No. 10/866,349, filed on Jun. 11, 2004, now Pat. No. 7,186,330, and a continuation-in-part of application No. 11/503,034, filed on Aug. 11, 2006, now abandoned.

(51) Int. Cl.
*C02F 1/50* (2006.01)
(52) U.S. Cl. .................. 210/101; 210/127; 210/205; 210/207; 222/56
(58) Field of Classification Search ................ 210/101, 210/105, 127, 86, 87, 198.1, 205–207; 222/56
See application file for complete search history.

(56) References Cited

U.S. PATENT DOCUMENTS

| | | | |
|---|---|---|---|
| 3,727,632 A * | 4/1973 | Pansini | 137/268 |
| 3,996,139 A | 12/1976 | Prince et al. | |
| 4,019,983 A | 4/1977 | Mandt | |
| 5,019,250 A * | 5/1991 | Lorenzen | 210/85 |
| 5,221,470 A * | 6/1993 | McKinney | 210/151 |
| 5,770,081 A * | 6/1998 | McKinney | 210/620 |
| 6,627,071 B1 | 9/2003 | Braden | |
| 6,932,912 B2 | 8/2005 | Chaffin | |
| 2003/0155311 A1 * | 8/2003 | Chaffin | 210/754 |

* cited by examiner

*Primary Examiner*—Terry K Cecil

(57) ABSTRACT

A system for introducing a liquid disinfectant into treated wastewater comprising a source of liquid disinfectant, a sensor to detect flow or level of treated wastewater from a wastewater treatment system, a selectively operable valve to allow the liquid disinfectant to flow via gravity into the treated wastewater and a controller operatively connected to the sensor to open the valve in response to sensed, increased flow or level of the treated wastewater in a receiver for the wastewater above a sensed, predetermined point.

5 Claims, 5 Drawing Sheets

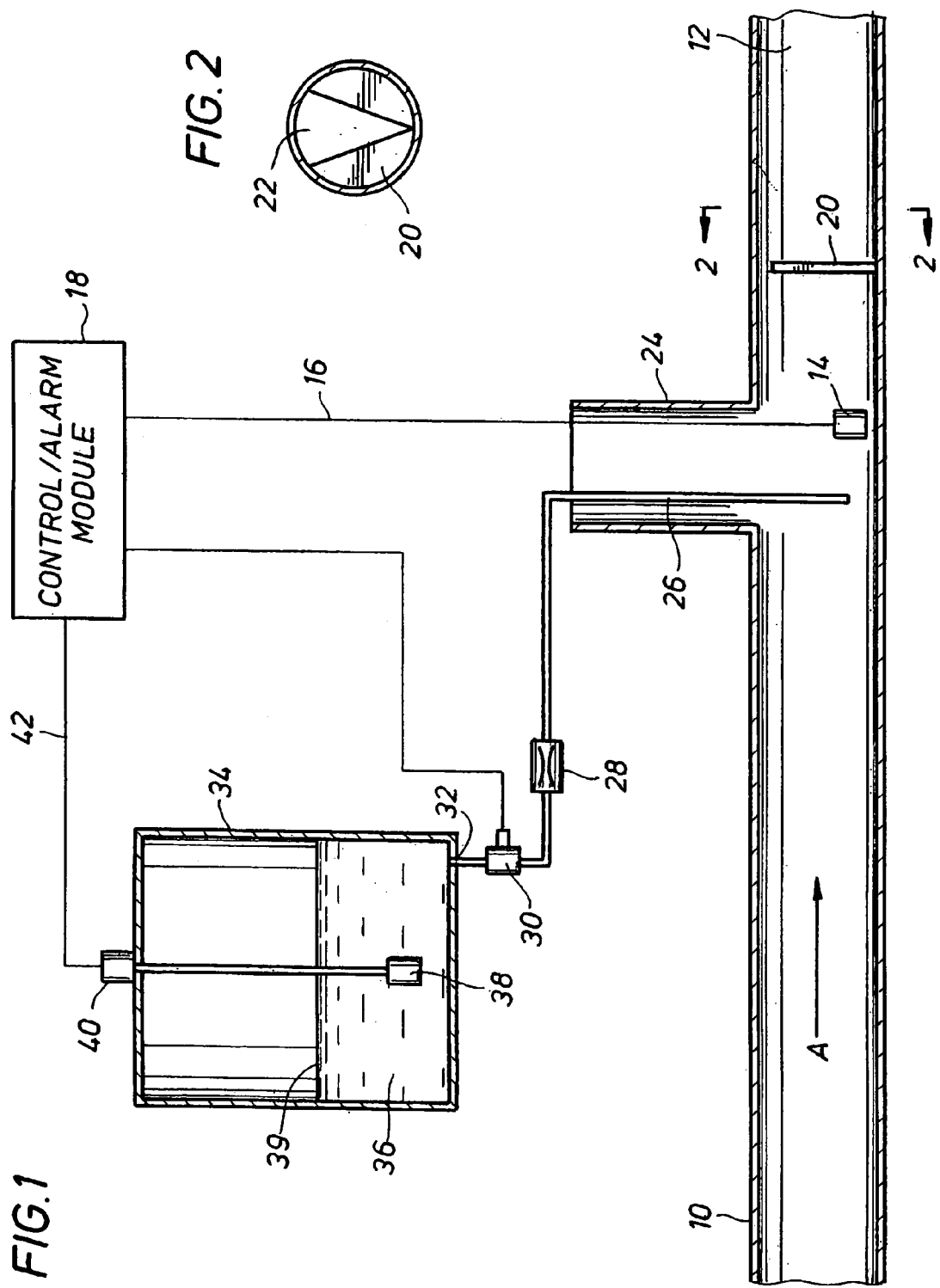

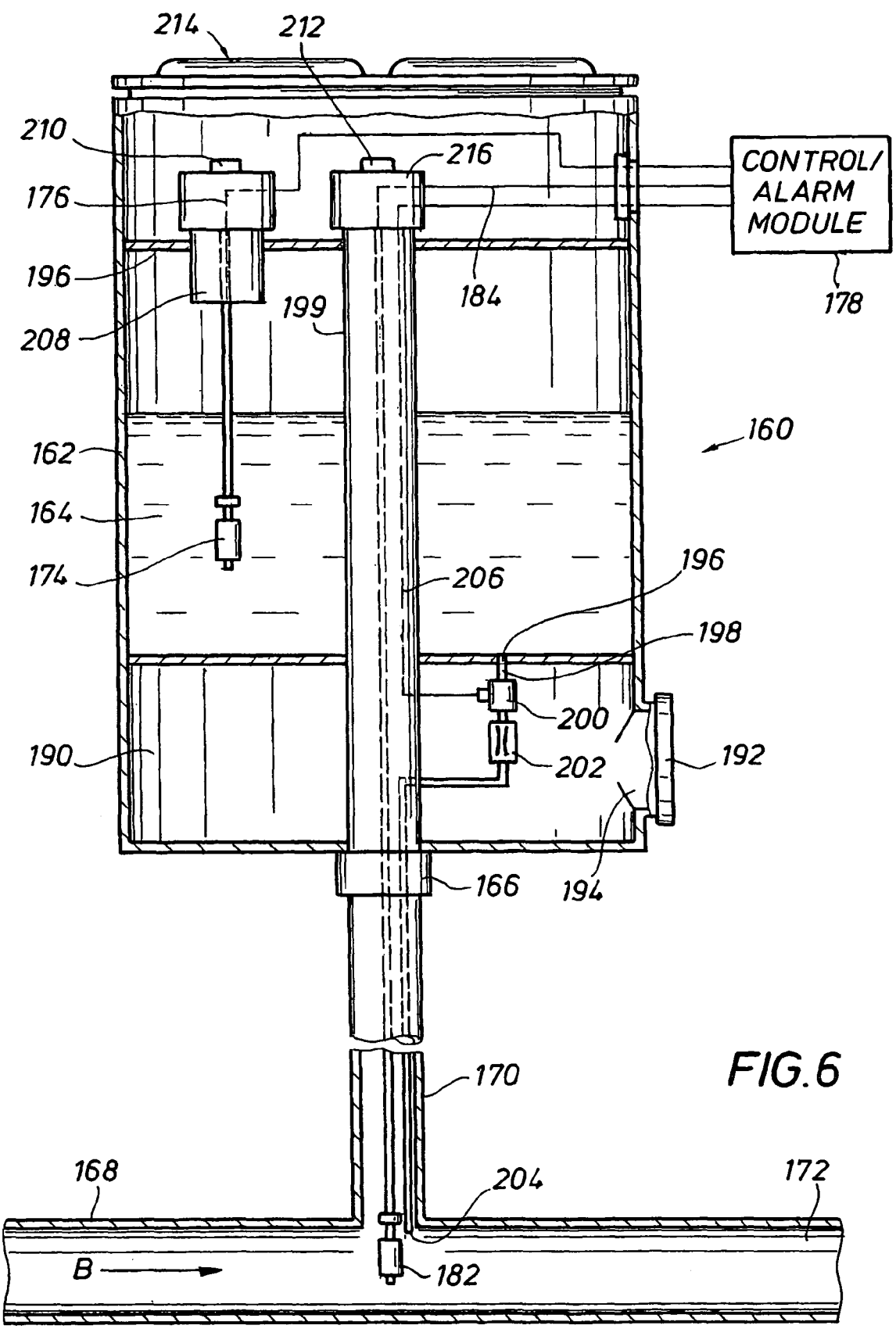

DISINFECTANT SYSTEM FOR USE WITH RESIDENTIAL AEROBIC WASTEWATER TREATMENT PLANTS

CROSS REFERENCE TO RELATED APPLICATION

This application is a continuation-in-part of U.S. Ser. No. 10/866,349, filed Jun. 11, 2004, now U.S. Pat. No. 7,186,330, and U.S. Ser. No. 11/503,034 filed Aug. 11, 2006, now abandoned, the disclosure of which is incorporated herein by reference for all purposes.

BACKGROUND OF THE INVENTION

1. Field of the invention

The present invention relates to the treatment of wastewater from an aerobic wastewater treatment plant. More particularly, the present invention relates to a system for disinfecting wastewater from an aerobic wastewater treatment plant using a liquid disinfectant.

2. Description of the prior art

Aerobic wastewater treatment plants are commonly used in the United States in areas where there is a lack of municipal sewerage treatment and disposal. These generally small volume plants, e.g., flow rates of under 5,000 gallons per day, typically comprise an aerobic treatment chamber wherein the sewerage is initially subjected to bacterial action to break down the solids, a clarifier to allow residual solids to be removed from the aerobically digested sewerage to produce treated wastewater, and a discharge system which typically is in the form of a pump tank containing a discharge pump which can be used to discharge the treated water in the pump tank in a variety of ways, e.g., night spray systems, drip irrigation systems, discharge into a stream or the like.

Regardless of the method by which the water is finally discharged, most State and Federal regulations require that the water to be discharged be disinfected to eliminate or at least reduce the bacteria to an acceptable level. For this purpose, it has been common to use chlorinators, particularly chlorinators using tablets or other forms of solid, chlorine generating materials. It is also known to use liquid chlorinators wherein an amount of a liquid chlorine containing composition is injected into the clarified (treated) wastewater.

Typically liquid chlorinators have relied on the use of venturis or venturi-like pumps (venturi systems) to draw the liquid chlorine composition from a storage system into wastewater passing through the venturi system. An inherent problem with these venturi systems is that the wastewater passing there through is generally not totally free of solids. Since typically the nozzles of venturi systems have small diameter openings, there is a likelihood of plugging of the venturi with a concomitant disabling of the liquid chlorine composition infusion system. Examples of typical liquid chlorinators or liquid disinfectant systems employing the aspirating phenomena of venturi systems include U.S. Pat. Nos. 3,996,139; 4,019,983; 6,627,071 and U.S. Patent Application Publication 2003/0155311.

SUMMARY OF THE INVENTION

In one aspect, the present invention provides a system for introducing a liquid disinfectant into treated wastewater comprising a source of liquid disinfectant; a sensor to detect flow or level of treated wastewater in a receiver in or from a wastewater treatment system; a valve to selectively release liquid disinfectant from the source which is disposed to allow gravity flow of liquid disinfectant into the receiver containing the treated wastewater; and a control system operatively connected to the sensor to open the valve in response to increased flow or level of treated wastewater in the receiver above a sensed, predetermined point.

BRIEF DESCRIPTION OF THE DRAWINGS

FIG. 1 is a schematic diagram showing one embodiment of the liquid disinfectant system of the present invention wherein the liquid disinfectant is introduced into a conduit or the like from an aerobic wastewater treatment system.

FIG. 2 is a view taken along the lines 2-2 of FIG. 1.

FIG. 6 is an elevational, schematic view of another embodiment of the present invention wherein the disinfection system of the present invention is in a self-contained unit which can be attached to a conduit passing treated wastewater from an aerobic wastewater treatment plant.

DESCRIPTION OF THE ILLUSTRATED EMBODIMENTS

Figure 3:
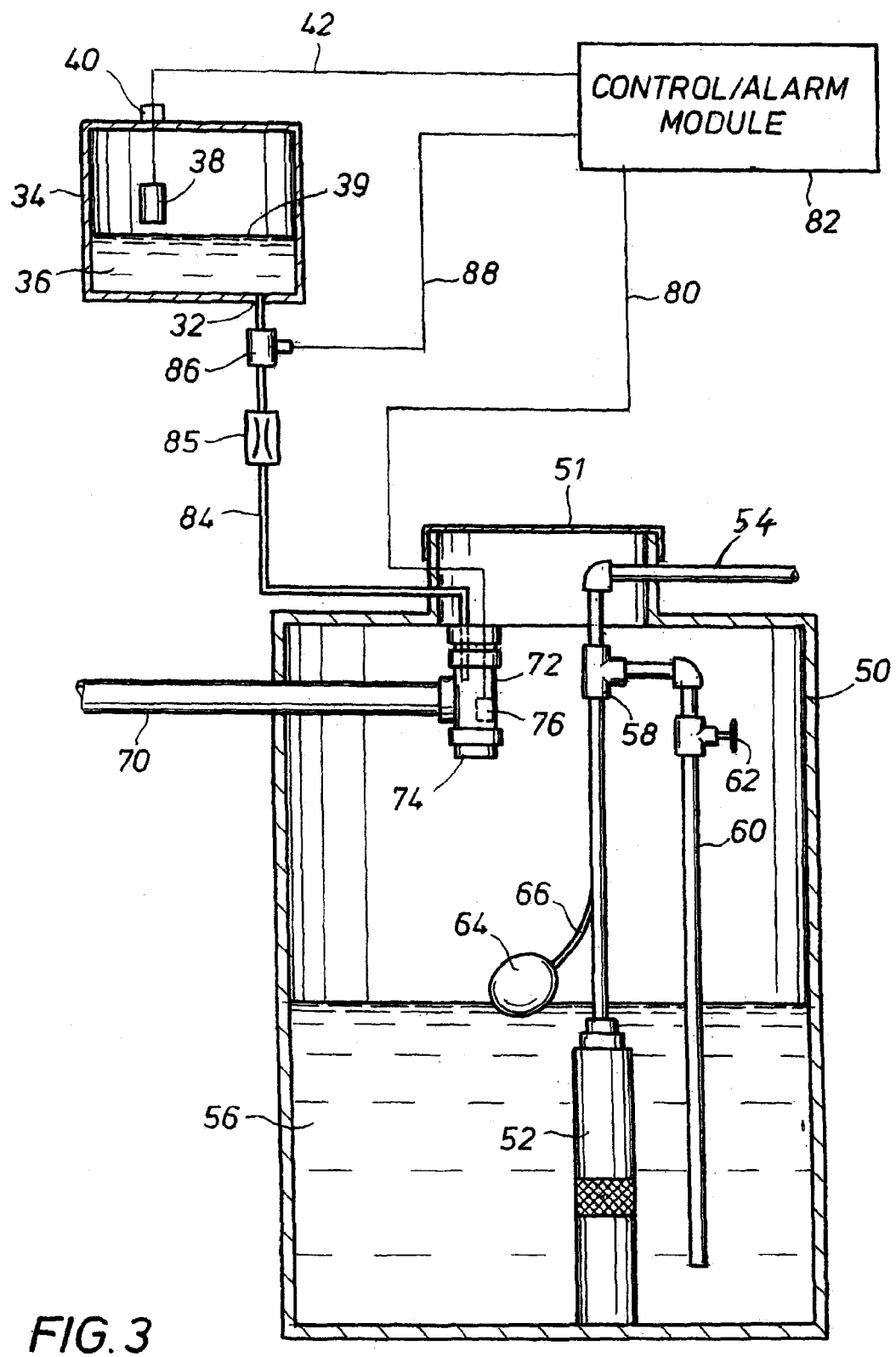
FIG. 3 is an elevational, schematic view of another embodiment of the present invention wherein the liquid disinfectant system is disposed to introduce disinfectant into a pump tank from which treated and disinfected water is discharged.

The disinfection system of the present invention is directed to use with any wastewater treatment plant but is especially useful in wastewater treatment plants which can be referred to as "residential aerobic treatment systems" (RATS) and is intended to encompass any small volume (flow rates of less than about 5,000 gallons per day, preferably flow rates of from 500 to 1,000 gallons per day) system whether residential or not wherein raw sewerage effluent is aerobically treated and disinfected before being discharged to a drain field, a spray system, or as an effluent into a stream or the like.

The disinfection system of the present invention is directed towards disinfecting "treated wastewater." As used herein, treated wastewater refers to water from which most of the solids have been removed via bacterial digestion of digestible solids under aerobic conditions, e.g., water removed from the clarifier of a RATS.

Turning to FIG. 1, treated water enters conduit 10 from a RATS and flows in the direction of arrow A through conduit 10 towards a discharge outlet 12. Discharge outlet 12 can be connected to a pump tank where treated disinfected water is held to be pumped to a drip irrigation system, a spray field or simply discharged into a stream, i.e., by bypassing the pump tank. As the treated water passes through conduit 10, it impinges upon a sensor 14 which is connected via connector 16 to a control/alarm module 18. In the case where sensor 14 has a float or the like, sensor 14 in combination with a weir 20 downstream of sensor 14 can act as a flow or level sensor. In this regard, the purpose of weir 20 is to raise the level of the water flowing in conduit 10 sufficiently to cause the float of sensor 14 to rise and via a switch or the like (not shown) send a signal to control/alarm module 18. The weir 20 as seen in FIG. 2 is simply a disk with a V slot 22. It will be understood that weir 20 can take many shapes, its sole purpose being to cause a temporary rise in the water level in conduit 10 upstream of weir 20 sufficient to cause the float of sensor 14 to rise and signal control/alarm module 18. It will be understood that the combination of the float in sensor 14 and weir 20 can act either as a flow sensor, i.e., it senses when flow in conduit 10 increases from a normal first rate, e.g., no flow, to a second, predetermined higher rate or a level sensor, i.e., it senses a change in level of wastewater above a predetermined point. Other types of flow sensors which can be employed include positive displacement flow sensors, velocity meters, true mass flow meters, paddle-type flow switches, impeller liquid flow sensors, etc.

When sensor 14 is simply a level sensor or detector, it will be apparent that while weir 20 could be employed, it could also be dispensed with since any increase in flow would raise the level of wastewater in conduit 10 such that the level detector or sensor will be operative without the presence of weir 20. Non-limiting examples of suitable liquid level sensors include single, dual probe and continuous capacitive liquid level sensors, single, dual and multi-probe conductive liquid level sensors, electro-optic liquid level sensors, ultrasonic level sensors, float type level sensors, etc.

Although as shown, weir 20 is of the fixed variety, it will be appreciated that a variable weir could be employed, the weir being of a type in which the V slot 22 can be varied in size.

Connected to conduit 10 and extending generally vertically up therefrom is a standpipe 24, connector 16 being disposed in standpipe 24. Also disposed in standpipe 24 is a feedline 26 which in turn is connected to a flow restrictor 28. A solenoid valve 30 is upstream of flow restrictor 28 and is in open communication with an outlet 32 in a container 34 for liquid disinfectant 36 contained therein. Solenoid valve is connected to control/alarm module 18 via an electrical conductor 33.

Disposed in disinfectant vessel 34 is a low level sensor 38 which is connected to a switch 40, switch 40 being connected via an electrical conductor 42 to control/alarm module 18.

As can be seen, container 34 is disposed relative to conduit 10 and hence treated wastewater therein so as to permit gravity flow of disinfectant 36 into the treated wastewater when valve 30 is in the open position.

In operation, and as is well known to those skilled in the art, there may be no or a small flow of treated water passing through conduit 10 past sensor 14, weir 20 and out discharge outlet 12. However, if due to usage of the RATS resulting from common residential activities, e.g., bathing, toilet usage, etc., there is a surge or increase of flow of treated water in conduit 10 which raises the level of treated water in conduit 10 upstream of weir 20, and if sensor 14 has a float, the float will rise sending a signal to control/alarm module 18, In any event, the signal triggers control/alarm module 18 to open valve 30 which in turn allows gravity flow of liquid disinfectant 36 from container 34 through valve 30 and line 26 into the treated water in conduit 10. The release of disinfectant from container 34 continues until the water level upstream of weir 20 in conduit 10 drops, i.e., until flow through conduit 10 returns to a "normal" rate, e.g., no flow. This of course results in the lowering of the level of water in conduit 10 upstream of weir 20 causing the float in sensor 14 to now move downwardly and send a signal to control/alarm module 18 which in turn closes valve 30 thereby discontinuing the gravity flow of disinfectant 36 into conduit 10.

To ensure that there is always disinfectant 36 in container 34, there is a low level sensor 38 which, if the level 39 of disinfectant 36 in container 34 drops to a certain predetermined level, will close low level switch 40 which in turn will send a signal to control/alarm module 18 via conductor 42 and trigger an alarm which can be visual, audio, etc. to tell the user of the system that the level of disinfectant 36 in container 34 needs to be replenished.

As noted in the detailed description above, sensor 14 contains a float which acts in combination with weir 20 to effectively form a flow sensor. However, other types of flow sensors or liquid level sensors could be employed.

When a weir is used, it can take the form of a rectangular weir, a triangular or v-notch weir as shown in FIG. 2 or a Cipollegiti weir. As noted a variable weir can also be used.

As noted above, there is a flow restrictor 28 downstream of valve 30. Although not absolutely necessary, it is desirable to incorporate flow restrictor 28 to aid in controlling the amount and rate of disinfectant 36 released into the treated wastewater in conduit 10.

Low level sensor 38 shown in FIG. 1 can be any type of level sensor that can detect the level of a liquid in a vessel. For example any of the liquid level sensors described above can be employed as will as any of numerous other types of liquid level indicators/sensors. For example, there may also be used pilot-operated Cage-type gauges, chain or tape float gauges, magnetic float gauges, displacement-type liquid level elements such as torque-tube units and force-balance units, proximity sensor, light pipe sensors, etc. Such sensors can also be used as sensor 14.

Turning to FIG. 3, there is shown another embodiment of the disinfection system of the present invention. As noted above, in many cases a RATS contains a pump tank which holds treated water and also houses a discharge pump to pump the water from the pump tank to its end disposal. Turning then to FIG. 3 there is a pump tank 50 in which is housed a discharge pump 52, discharge pump 52 being connected to a discharge conduit 54 through which treated wastewater 56 from pump tank 50 is discharged. There is a T-connection 58 which connects discharge pipe 54 to a return or recirculation pipe 60 via a valve 62. Return pipe 60 serves to ensure, depending upon the setting of valve 62, whether a certain portion of the water being discharged to discharge pipe 54 is returned to pump tank 50 to ensure adequate mixing and residence time of the disinfectant in the treated water, the goal being that the water finally discharged through discharge pipe 54 is disinfected, treated wastewater.

Disposed in pump tank 50 is a float 64 connected by a float arm 66. Although not shown, float arm 66 is connected to a switch which allows electrical power to be supplied to discharge pump 52 such that when float 64 reaches an upper, predetermined level, discharge pump 52 is turned on and disinfected, treated wastewater is discharged through discharge pipe 54.

Treated wastewater from a RATS is introduced into pump tank 50 through line 70 where it enters a T-connection 72, the bottom portion of which is connected to a flow restrictor 74. Disposed in T-connection 72 in which is disposed a sensor 76 having a float connected to a float switch (not shown) which in turn is electrically connected via electrical conductor 80 to a control/alarm module 82. A disinfectant feed line 84 has an open end disposed internally of T-connection 72 and is connected via a flow restrictor 85 and a solenoid valve 86 to outlet 32 of container 34. Solenoid valve 86 is electrically connected to control/alarm module 82 via a conductor 88.

In operation, wastewater entering pump tank 50 through line 70 will cause a temporary rise in the level of treated wastewater in conduit 70 and T-connection 72 depending on the setting of flow restrictor 74. Accordingly, in the case where sensor 76 has a float, float 76 will be caused to rise sending a signal via conductor 80 to control/alarm panel 82 which in turn will send a signal via line 88 to solenoid valve 86 signaling valve 86 to open with the result that liquid disinfectant 94 will flow via gravity into T-connection 72. As in the case of the embodiment shown in FIG. 1, low level sensor 38 is activated when the liquid disinfectant 36 in container/disinfectant tank 34 falls below a certain level, a condition which is indicated in FIG. 3. This will result in the sending of a signal via conductor 42 control/alarm module 82 triggering an alarm to indicate to the user that the level of disinfectant 36 in disinfectant tank 34 is low.

Pump tank 50 is provided with a selectively openable hatch 51 through which access can be had to perform maintenance, e.g., on the sensors, pump, etc.

As described above with respect to the embodiment of FIG. 1, any type of flow or level sensor can be employed in lieu of flow restrictor 74 and float sensor 76, For example, so called head flow meters which operate by measurement of the pressure differential or head across a suitable restriction to flow can be employed. In addition, various flow meters such as rotameters, piston-type meters, rotating meters and the like can also be employed.

Figure 4:
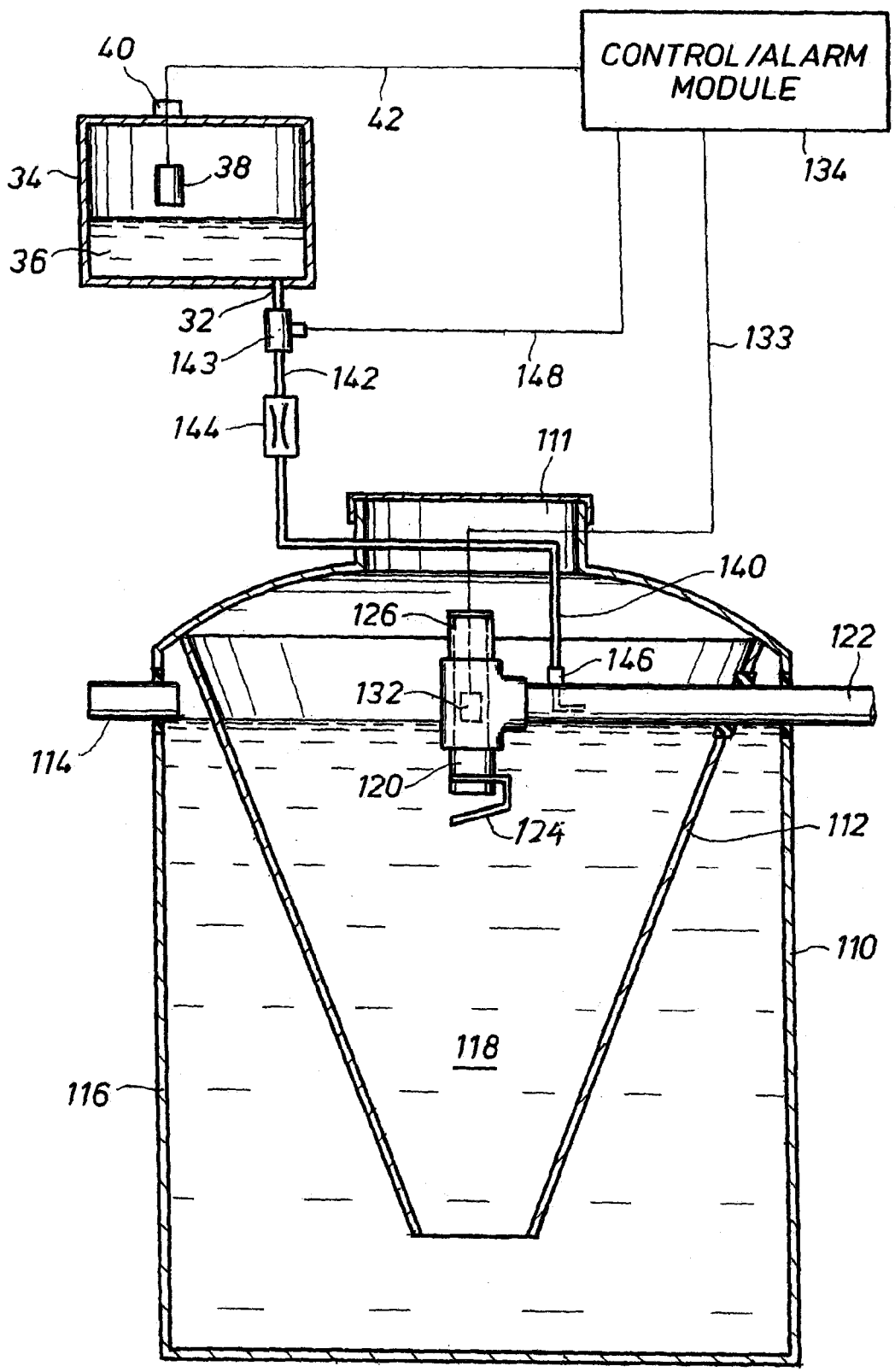
FIG. 4 is an elevational, schematic view of another embodiment of the present invention wherein the liquid disinfectant system is disposed to introduce disinfectant into the discharged, treated, disinfected wastewater from the clarifier portion of a typical aerobic wastewater treatment plant.

Turning now to FIG. 4, there is shown yet another embodiment of the present invention. FIG. 4 depicts an embodiment of the disinfecting system of the present invention wherein the disinfectant is added into the discharge from the clarifier portion of the RATS. As noted above, a typical wastewater plant such as disclosed in U.S. Pat. No. 5,221,470, incorporated herein by reference for all purposes, is comprised of a cylindrical tank 110 in which is disposed an inverted frustro-conical partition 112. Wastewater from a residence or the like is introduced into tank 110 through a conduit 114. Although not shown, it is common for tank 110 to have disposed therein an aerator to supply oxygen to the wastewater to promote the aerobic bacterial action that converts digestible solids in the wastewater to carbon dioxide and water. Thus, a typical RATS includes what can be referred to as a digestion or aerobic chamber 116 and a clarifier chamber 118. As the untreated wastewater that enters tank 110 through conduit 114 is aerobically digested in chamber 116, largely clarified, treated wastewater rises in clarifier chamber 118, ultimately being discharged via a riser 120 which T's into a discharge pipe 122. The lower end of riser 120 is provided with a baffle 124 which minimizes solids rising upwardly in chamber 18 from entering riser 120. A hatch 111 is located at the upper end of tank 110 to provide access to the inside of the tank 110. Disposed in riser 120 is a surge control weir 126 which is described in detail in U.S. Pat. No. 5,770,081, incorporated herein by reference for all purposes.

Figure 5:
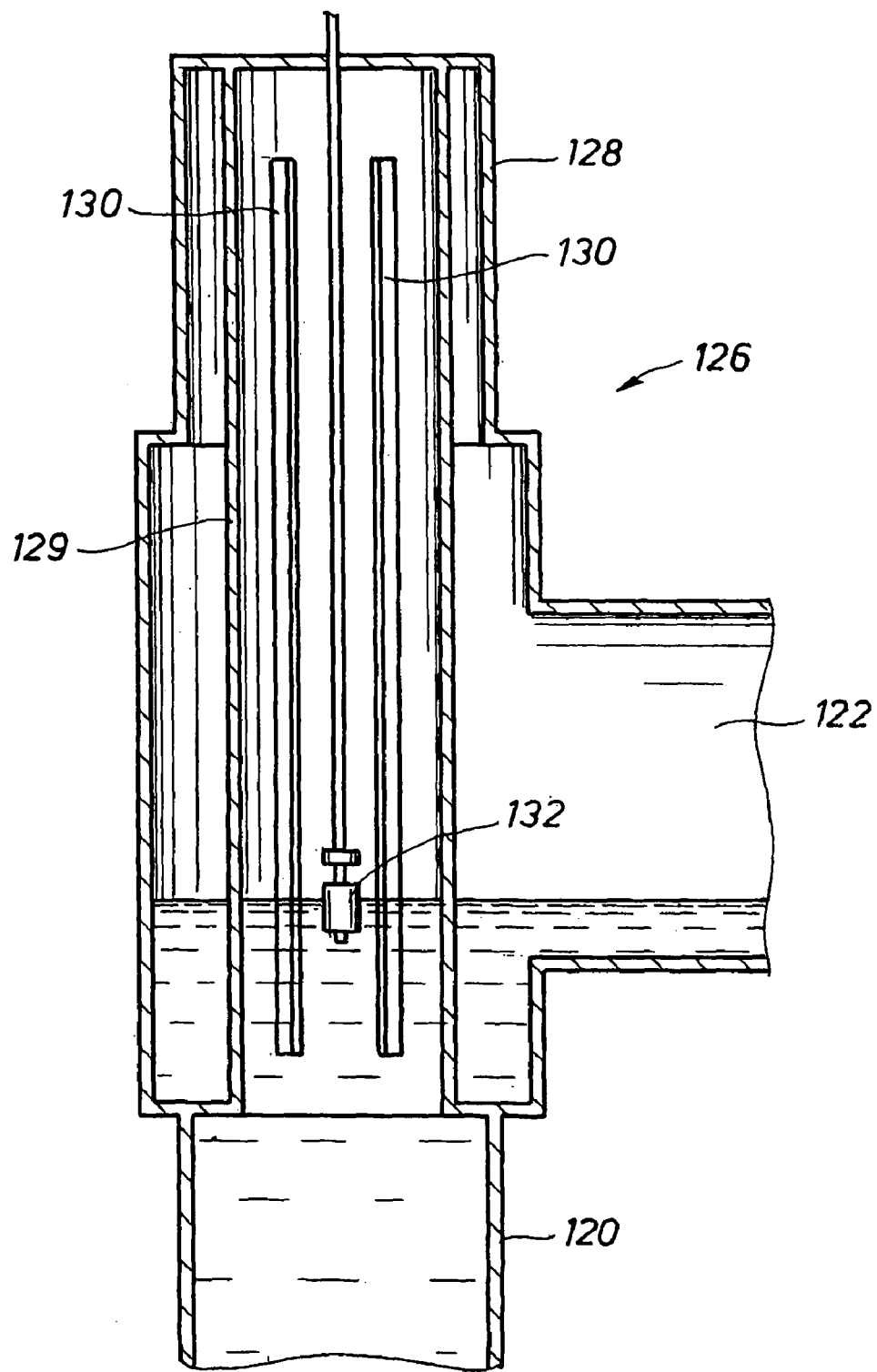
FIG. 5 is an enlarged view of the flow/level sensor assembly shown in FIG. 4.

As seen with reference to FIG. 5, weir 126 is comprised of a generally cylindrical, outer body 128 and a generally cylindrical inner, body 129 having a series of longitudinally extending slots 130. Although not shown, there is a seal which prevents treated water from chamber 118 from bypassing weir 126, i.e., treated water exiting chamber 118 through riser 120 enters the interior of body 129 of weir 126, the water exiting through slots 130 into discharge pipe 122. As can also be seen from FIG. 5, disposed internally of weir 126 is a sensor having a float 132 which, while not shown, is electrically connected to control/alarm module 34 in the same manner described above with respect to the embodiment of FIGS. 1 and 3. Alternatively, rather than a float/sensor, any kind of flow rate or level sensor which is connected to a sensor switch, e.g., a float switch, or directly to a control/alarm module can be used. As seen in FIG. 4, float/sensor 132 is electrically connected via an electrical conductor 133 to control/alarm module 134.

A feedline 140 extends and has an open end and discharge pipe 122, feedline 140 extending through a fitting 146. Feedline 140 is in turn connected to the outlet 32 of container 34 via a solenoid valve 143 in a downstream, flow restrictor 144. As can be seen, container 34 is positioned relative to discharge conduit 122 such that disinfectant 36 can flow via gravity from container through solenoid valve 143, flow restrictor 144 and into discharge conduit 122.

In operation, when the water in clarifier chamber 118 suddenly rises as would be caused by a surge of wastewater from residential usage into chamber 116 through conduit 114, float/sensor 132 would be activated, i.e., the float in sensor 132 would be raised to close an optional float switch (not shown) which in turn would send a signal to control/alarm module 134. In response to this signal, a signal would be sent via line 148 to solenoid valve 143, opening valve 143 and allowing gravity flow of disinfectant 36 through flow restrictor 144 and feedline 140 into conduit 122. As in the case of the embodiments of FIGS. 1 and 3, flow restrictor 144 acts as a throttling valve to control the amount of liquid disinfectant 36 introduced into the treated wastewater. Further, as in the case of the embodiments shown in FIGS. 1 and 2, container 34 has disposed therein a low level sensor 38 which in turn is connected to control alarm module 134 via an electrical connection 42. Accordingly, should the disinfectant level in container 34 fall below a certain, desired level, low level sensor 38 will be activated sending a signal via connector 42 to control/alarm module 134 which in turn will activate an alarm to inform the user of the system that the liquid disinfectant in container 37 is at a low level.

Once again it will be seen that the combination of weir assembly 126 and sensor 132 act as a flow rate sensor to indicate that a surge of water (increased flow) has entered clarifier chamber 118 and that hence there is a need for liquid disinfectant to be added such that the discharge from discharge conduit 122 is disinfected, treated water. As well this combination can act as a level sensor.

As in the case of the other embodiments described above, the sensor 132 could take the form of any numerous types of level detectors or flow detectors as described above.

Referring now to FIG. 6, there is shown yet another embodiment of the present invention. Basically the embodiment of FIG. 6 differs from those previously described in that the disinfectant system is largely a self-contained module that can be conveniently attached to a transfer conduit through which treated wastewater from a RATS is passing, e.g., to a pump tank, discharge into a stream, etc.

Referring then to FIG. 6, the disinfection unit, shown generally as 160, comprises a vessel 162 in which is contained a liquid disinfectant 164. Disinfectant unit 160 also includes a compartment 190 which is below vessel 162 and which can be accessed by hatch 192 through an opening 194 in the wall of disinfectant unit 160. Disinfection unit 160 includes a grade adjustment 166 which allows unit 160 to be conveniently connected to a subsurface transfer conduit 168 by means of a riser 170. It will be understood that treated wastewater enters conduit 168 in the direction of arrow B and is discharged, e.g., either to a pump tank, stream or the like through outlet 172. Disposed in vessel 162 is a low level sensor 174 which is connected via an electrical connector 176 to a control/alarm module 178. There is also a sensor 182 disposed in conduit 168, sensor 182 being electrically connected via a line 184 to control/alarm module 178.

It will be understood that FIG. 6 is a simplified schematic form of the invention and that there would be a suitable mounting platform or partition 196 or the like which would hold a riser 199 through which the connector to sensor 182 runs, as well as a riser 208 through which low level sensor 174 is suspended. As can also be seen, there are access plugs 210 and 212 to permit access to risers 200 and 201 for the purpose of servicing low level sensor 174 and sensor 182. Additionally, there are several hatches 214 and 216 in the unit 160 which permit the system components mounted on platform 196 to be serviced.

In operation, when sensor 182 detects increased flow or level of treated wastewater in conduit 168, a signal is sent via electrical connector 184 to control/alarm module 178 which in turn triggers control/alarm module 178 to send a signal to solenoid valve 200 via connector 206 opening valve 200 and resulting in gravity flow of liquid disinfectant 164 into feedline 198 through flow restrictor 202 and out the open end 204 of feedline 198 into conduit 168.

So long as flow sensor 182 detects sufficient flow or level of treated wastewater, valve 200 will remain open, it being understood that in the case of the embodiment shown in FIG. 6 as well as the other embodiments, once flow of treated wastewater has ceased or has returned to below a predetermined flow rate or the level thereof has dropped below a predetermined point, e.g., no flow or little or no wastewater in conduit 160, sensor 182 or any of the sensors described above with respect to the other embodiments will then signal valve 200, via control/alarm module 178, to close thereby ceasing gravity flow of liquid disinfectant 164. It will be understood that a predetermined flow rate, i.e., a rate at which a flow sensor is not activated, can be no flow. Further, a predetermined level at which a level detector is not activated can be a low level or no level of wastewater.

The term "receiver" as used herein, is intended to mean any pipe, conduit, container or the like through which treated wastewater passes, continuously or intermittently, or in which treated wastewater is held for subsequent discharge from the RATS. The receiver can be an actual part of the RATS, e.g., a conduit or the like typically forming some of the plumbing of a common RATS or can be a discharge line from the RATS. It is also contemplated that a receiver within the meaning ascribed herein could be a containment to which treated wastewater is diverted simply for the purpose of determining whether the level of treated wastewater is above or below a predetermined point.

The term liquid disinfectant, as used herein, is intended to mean any chemical composition which is in the liquid form, e.g., a gas, solid or other liquid which can be dissolved in an aqueous medium and which is commonly used for disinfecting water. Non-limiting examples of such compositions include aqueous solutions of chlorine, bromine, iodine, solutions of sodium hypochlorite, solutions of other solid disinfectants which are soluble in water, etc. Alternatively, the liquid disinfectant can be a non-aqueous liquid, e.g., bromine.

Modifications of the apparatus, procedures and conditions disclosed herein that will still embody the concept of the improvements described should readily suggest themselves to those skilled in the art, and are intended to be encompassed within the spirit of the invention presently disclosed herein as well as the scope of the appended claims.

What is claimed is:

1. An apparatus for treating wastewater with a liquid disinfectant comprising:
    a vessel for wastewater;
    an inlet conduit for introducing wastewater into said vessel;
    a pump disposed in said vessel and having a pump discharge;
    a discharge conduit having an outlet and operatively connected to said pump discharge for discharging water from said vessel;
    a recirculation conduit operatively connected to said pump discharge for recycling a portion of the wastewater discharged from said pump back into said vessel;
    a container for liquid disinfectant;
    a feedline connected to said container to feed liquid disinfectant into said inlet conduit;
    a valve in said feedline selectively operable to open and close to control flow of disinfectant through said feedline, said container being positioned relative to said wastewater in said vessel to permit gravity flow of said disinfectant into said wastewater in said inlet conduit; and
    a sensor to detect at least one of flow or level of wastewater in said inlet conduit;
    a control system operatively connected to said sensor and said valve, said control system serving to selectively open said valve in response to sensed, increased flow or level of treated wastewater above a predetermined point.

2. The apparatus of claim 1, wherein said valve comprises a solenoid valve.

3. The apparatus of claim 1, wherein there is a flow restrictor in said feedline.

4. The apparatus of claim 1, wherein there is a flow restrictor in said recirculation conduit.

5. The apparatus of claim 1, wherein said container is disposed inside of said vessel.

* * * * *